US010101358B2

(12) United States Patent  
Cozac et al.

(10) Patent No.: US 10,101,358 B2  
(45) Date of Patent: Oct. 16, 2018

(54) TRIMMING CIRCUIT FOR A SENSOR AND TRIMMING METHOD

(71) Applicants: Emil Cozac, Balma (FR); Jerome Enjalbert, Fonsorbes (FR); Jalal Ouaddah, Toulouse (FR)

(72) Inventors: Emil Cozac, Balma (FR); Jerome Enjalbert, Fonsorbes (FR); Jalal Ouaddah, Toulouse (FR)

(73) Assignee: NXP USA, Inc., Austin, TX (US)

( * ) Notice: Subject to any disclaimer, the term of this patent is extended or adjusted under 35 U.S.C. 154(b) by 112 days.

(21) Appl. No.: 14/899,149

(22) PCT Filed: Jul. 3, 2013

(86) PCT No.: PCT/IB2013/001763  
§ 371 (c)(1),  
(2) Date: Dec. 17, 2015

(87) PCT Pub. No.: WO2015/001370  
PCT Pub. Date: Jan. 8, 2015

(65) Prior Publication Data  
US 2016/0139174 A1 May 19, 2016

(51) Int. Cl.  
*G01P 21/00* (2006.01)  
*G01D 3/036* (2006.01)

(52) U.S. Cl.  
CPC .............. *G01P 21/00* (2013.01); *G01D 3/036* (2013.01)

(58) Field of Classification Search  
USPC ....................................................... 73/1.37  
See application file for complete search history.

(56) References Cited

U.S. PATENT DOCUMENTS 4,045,973 A * 9/1977 Anderson ............ F24F 11/0009  
                                                                           318/778  
4,277,022 A * 7/1981 Holdsworth ......... A01C 15/122  
                                                                           222/55

(Continued)

FOREIGN PATENT DOCUMENTS

EP         0655606         5/1995

OTHER PUBLICATIONS

International Search Report and Written Opinion correlating to PCT/IB2013/001763 dated Dec. 17, 2013.

(Continued)

*Primary Examiner* — Eric S McCall  
*Assistant Examiner* — Mohammed E Keramet-Amircola  
(74) *Attorney, Agent, or Firm* — Charlene R. Jacobsen (57) ABSTRACT

An on-board trimming circuit suitable for trimming an accelerometer provides offset trim and gain trim modules for determining correct trim codes for subsequent programming into the trimming circuit. The correct trim codes may be determined by comparing sensor outputs which have been adjusted by successive trim codes, with a reference voltage in a comparator until the comparator toggles or by using a successive approximation technique. The reference voltage is supplied form a tap of a feedback resistance divider circuit which forms a part of an on-board voltage reference generator which may be used to provide a full scale reference for an analog to digital converter which converts a sensor output voltage into a digital signal. Using these reference voltages significantly lessens the impact of any offsets inherent in the voltage reference generator on the trimming process.

12 Claims, 4 Drawing Sheets

(56) References Cited

U.S. PATENT DOCUMENTS

| | | | | |
|---|---|---|---|---|
| 5,048,343 A * | 9/1991 | Oboodi | ............... | G01L 1/2281 |
| | | | | 73/766 |
| 5,460,050 A * | 10/1995 | Miyano | ............... | G01L 9/065 |
| | | | | 73/708 |
| 5,479,096 A * | 12/1995 | Szczyrbak | ............... | G01D 3/0365 |
| | | | | 324/132 |
| 5,854,421 A * | 12/1998 | Yamamoto | ............... | G01D 3/036 |
| | | | | 73/1.88 |
| 6,053,050 A * | 4/2000 | Zahzah | ............... | G01B 7/18 |
| | | | | 73/769 |
| 7,724,068 B1 * | 5/2010 | Smith | ............... | G01K 3/005 |
| | | | | 327/513 |
| 7,886,583 B2 * | 2/2011 | Masser | ............... | G01Q 10/06 |
| | | | | 73/105 |
| 7,973,684 B2 * | 7/2011 | Nolan | ............... | H03F 3/195 |
| | | | | 330/9 |
| 8,573,055 B2 * | 11/2013 | Itakura | ............... | G01C 19/5776 |
| | | | | 73/1.37 |
| 2004/0187555 A1 * | 9/2004 | Zarabadi | ............... | G01P 15/125 |
| | | | | 73/1.37 |
| 2004/0233600 A1 * | 11/2004 | Yoshida | ............... | G05F 3/30 |
| | | | | 361/90 |
| 2005/0210952 A1 * | 9/2005 | McMahan | ............... | G01D 3/02 |
| | | | | 73/1.37 |
| 2005/0216149 A1 * | 9/2005 | Kato | ............... | G01P 21/00 |
| | | | | 73/1.37 |
| 2008/0123238 A1 * | 5/2008 | Campos | ............... | G06F 1/3203 |
| | | | | 361/103 |
| 2010/0071466 A1 | 3/2010 | Kanai et al. | | |
| 2010/0083672 A1 * | 4/2010 | Yoon | ............... | F25D 21/002 |
| | | | | 62/85 |
| 2011/0110164 A1 * | 5/2011 | Jeong | ............... | G11C 29/02 |
| | | | | 365/189.02 |
| 2012/0215477 A1 * | 8/2012 | Tuck | ............... | G01P 21/00 |
| | | | | 702/99 |
| 2014/0020444 A1 * | 1/2014 | Smith | ............... | F03D 11/0091 |
| | | | | 73/1.37 |
| 2014/0035560 A1 * | 2/2014 | Olmos | ............... | G01R 31/31719 |
| | | | | 324/76.41 |
| 2014/0062452 A1 * | 3/2014 | Ok | ............... | G05F 3/24 |
| | | | | 323/313 |
| 2014/0086279 A1 * | 3/2014 | Cao | ............... | G01K 7/01 |
| | | | | 374/183 |
| 2015/0266484 A1 * | 9/2015 | Moran | ............... | B60W 40/08 |
| | | | | 340/576 |

OTHER PUBLICATIONS

Staudt, "Comparator Based Self-Trim and Self-Test Scheme for Arbitrary Analogue On-Chip Values", IEEE 16th International Mixed Signals, Sensors and Systems Test Workshop (IMS3TW), Jun. 7-9, 2010, pp. 1-6.

\* cited by examiner

TRIMMING CIRCUIT FOR A SENSOR AND TRIMMING METHOD

FIELD OF THE INVENTION

This invention relates to a trimming circuit and method suitable for the trimming of sensors and has particular, though not exclusive, applicability to accelerometers.

BACKGROUND OF THE INVENTION

An accelerometer is a device that typically measures the acceleration experienced relative to freefall. Single- and multi-axis accelerometers are available to detect magnitude and direction of the acceleration as a vector quantity, and can be used to sense orientation, acceleration, vibration, shock, and falling. Micromachined accelerometers are increasingly present in portable electronic devices and video game controllers to detect the position of the device and/or provide for game input. Such accelerometers may be packaged in an integrated circuit device which may also include conditioning circuitry. Various sources of error in an accelerometer typically call for calibration before use. One of the leading sources of error in an accelerometer is attributed to the 0 g-offset or bias error. The 0 g-offset is defined as the difference between the measured value of the sensor from the true zero value. The 0 g-offset value is commonly subtracted when taking acceleration measurements. Accelerometers are typically calibrated by the semiconductor manufacturer prior to their installation into another device. For example, accelerometers are "trimmed" for 0 g-offset and sensitivity by adjusting the offset trim codes and gain (if the trimming is done using digitally-stored trim codes and a digital to analog converter). Other (analog) trim methods are also known. Many semiconductor devices incorporate a digital trim circuit, which can be used to adjust a device's operating voltages following manufacture. The programming of a trim circuit can be performed in accordance with trim codes, which comprise information corresponding to different adjustment values. A trim circuit is typically programmed by calibrating trim codes during a test operation. The test operation is typically performed by a dedicated test apparatus. In a conventional test operation, the test apparatus applies various signals to the device according to the trim codes and calibrates the trim codes according to the device's responses to the signals. Following the test operation, the calibrated trim codes are programmed into the device. US 2011110164 A1 describes an example of a trim circuit incorporated in a memory device. Even though accelerometers are calibrated by the semiconductor manufacturer, they can lose their calibration during use. For example, when the accelerometers are mounted onto a printed circuit board, various mechanical strains are produced. Such conditions can cause further 0 g-offset shifts. US 20120215477 A1 describes an accelerometer having an autocalibration function which permits the accelerometer to be re-calibrated over time.

SUMMARY OF THE INVENTION

The present invention provides a trimming circuit and trimming method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
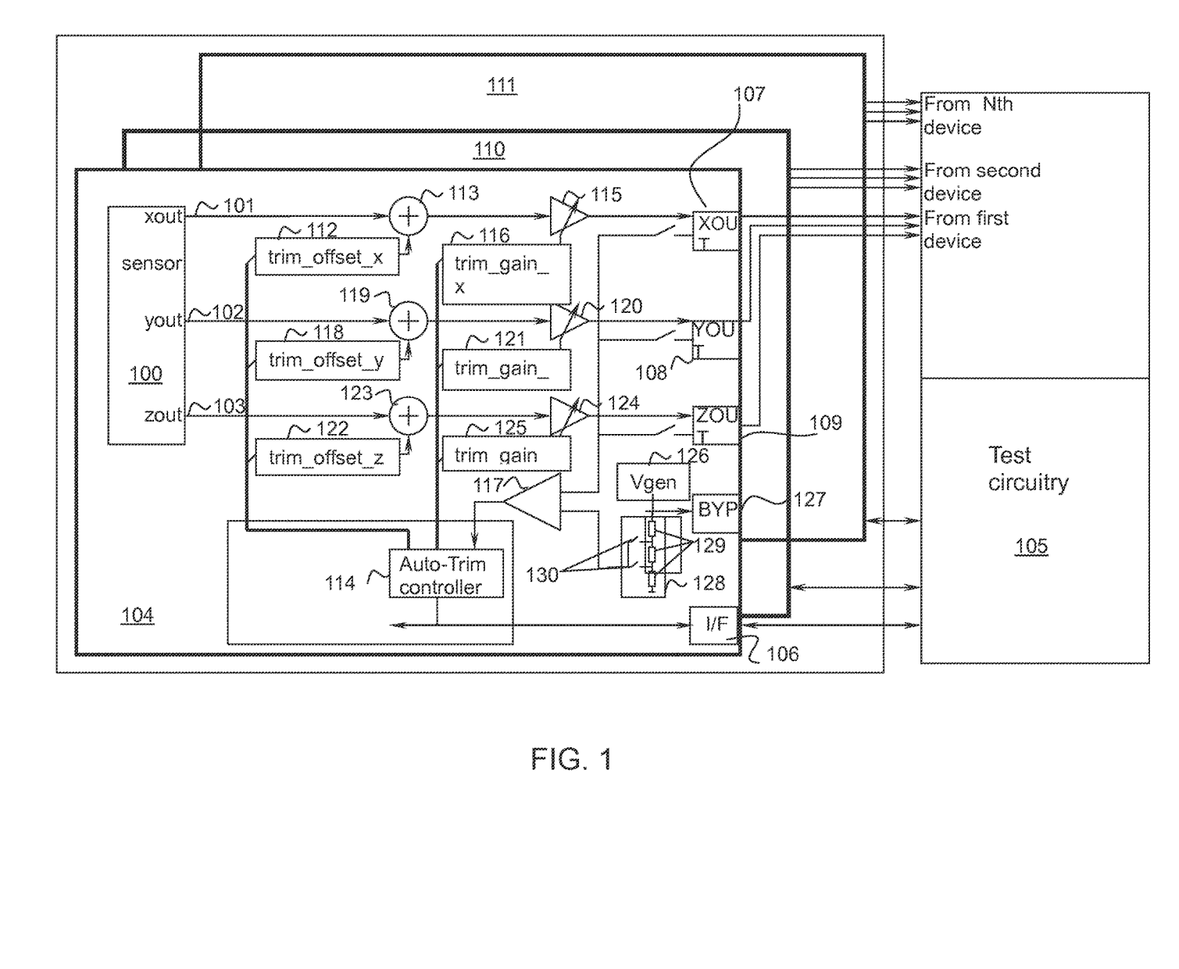
FIG. 1 shows a simplified block diagram of an example of trimming circuitry together with a test board and test equipment connections.

Referring to FIG. 1, a sensor 100 is capable of generating an output, for example a voltage, which is function of some parameter which the sensor detects and responds to. In the example of FIG. 1, the sensor may be an accelerometer (sometimes called a "gcell") and has three sensor outputs 101, 102 and 103 which relate to the sensor's response to accelerations applied to its x, y and z axis respectively. The sensor may be implemented within an integrated circuit package or device 104 which may also comprise trimming circuitry to be described herein. The device 104 may be a ratiometric device; for example, one which provides an output voltage in proportion with an acceleration and an applied reference voltage. The device 104 may be operably coupled with remote test circuitry 105 via a digital interface 106 and via x, y and z axis analog output ports 107, 108, 109 respectively. Other similar devices, 110, 111 may also be operably coupled to the test circuitry 105 for simultaneous trimming.

Trimming circuitry may comprise an x axis trim offset module 112 (which may comprise an offset trim DAC) which may be operably coupled between one input of a first summer module 113 and an autotrim controller module 114. A second input of the first summer module 113 may be operably coupled to the sensor's x axis output 101. An output of the first summer module 113 may be operably coupled to an input of a first variable gain amplifier 115. An x axis trim gain module 116 (which may comprise a gain trim DAC) may be operably coupled between the first variable gain amplifier 115 and the auto trim controller module 114. An output of the first variable gain amplifier 115 may be operably coupled to the x axis output port 107. The output of the first variable gain amplifier 115 may also be selectively coupled to a first input of a comparator 117.

Trimming circuitry may also comprise a y axis trim offset module 118 which may be operably coupled between one input of a second summer module 119 and the autotrim controller module 114. A second input of the second summer module 119 may be operably coupled to the sensor's y axis output 102. An output of the second summer module 119 may be operably coupled to an input of a second variable gain amplifier 120. A y axis trim gain module 121 may be operably coupled between the second variable gain amplifier 120 and the auto trim controller module 114. An output of the second variable gain amplifier 120 may be operably coupled to the y axis output port 108. The output of the second variable gain amplifier 120 may also be selectively coupled to the first input of the comparator 117.

Trimming circuitry may also comprise a z axis trim offset module 122 which may be operably coupled between one input of a third summer module 123 and the autotrim controller module 114. A second input of the third summer module 123 may be operably coupled to the sensor's z axis output 103. An output of the third summer module 123 may be operably coupled to an input of a third variable gain amplifier 124. An output of the third variable gain amplifier 124 may be operably coupled to the z axis output port 109. A z axis trim gain module 125 may be operably coupled between the third variable gain amplifier 124 and the auto trim controller module 114. The output of the third variable gain amplifier 124 may also be selectively coupled to the first input of the comparator 117.

The x, y and z axis trim offset modules 112, 118, 122 may comprise trim DAC's (digital to analog converters), as are known in the art, which may respond to trim codes provided by the autotrim converter module 114. A standard trim DAC may be built up from binary weighted trim elements such as bias current sources or resistor strings or weighted capacitors. Each bit of a trim DAC may comprise a trim element and a trim switch.

The x, y and z axis trim gain modules 116, 121, 125 may adjust the gain of the first, second or third variable gain amplifiers 115, 120, 124 respectively in response to receiving trim codes from the auto trim controller module 114.

A voltage reference generator module 126 may supply an output voltage VBYP at an output port 127 of the device 104. The voltage reference generator module 126 may be supplied from a main voltage supply (not shown) of the device 104. The regulated voltage VBYP may serve as full scale reference for any Analogue to Digital Converter (not shown) which may be connected to the device in use. The voltage reference generator module 126 may include feedback resistance divider circuitry represented by a module 128 in FIG. 1 which may include two or more resistors 129 and one or more taps 130 at the junctions of resistor pairs for example. Each tap may provide a (known) reference voltage which may be used in a trimming process to be described below. A voltage from any one tap may be selectively applied to a second input of the comparator 117 for comparison with an output from any one of the variable gain amplifiers 115, 120, 124. Selection of a particular reference voltage (from a particular tap of the feedback resistance divider circuit 128) may be controlled by the auto trim controller.

In operation of the exemplary trimming circuitry of FIG. 1, an output of the sensor (in this example, device 104 outputs 107, 108 or 109) may be compared in the comparator with a reference voltage taken from a tap 130 of the voltage generator's feedback resistance divider circuit 128. If the result of the comparison is that the two compared inputs are not equal then the output of the sensor may be adjusted in offset or gain and the comparison may be made again, this time between an adjusted sensor output and the reference voltage.

An offset trim procedure is performed in order to determine, for each axis, the offset trim codes. An offset may be applied to an output of the sensor by an adjustment circuit comprising a trim offset module 112 and a summer 113. For example, the autotrim controller 114, on receipt of an instruction from the test circuitry 105, may set an offset trim procedure in motion whereby the sensor's output is summed with successive trim values provided by the trim offset module 112 and the adjusted outputs are compared with a reference voltage in the comparator 117. One comparison per trim bit may be made. The results may be read and stored by the test circuitry 105.

A gain trim procedure is performed in order to determine, for each axis, the gain trim codes so that for a given acceleration (in the case where the sensor 100 is an accelerometer), the device's analog outputs at ports 107, 108, 109 will be close to prescribed values. For example, when trimming with one axis placed a +1 g acceleration, the expected output voltage would be V(0 g)+(nominal_sensitivity)×(1 g). V(0 g) value and its tolerance may, typically, be given in the device's datasheet. Similarly then, a gain adjustment may be applied to an output of the sensor 100 by an adjustment circuit comprising a trim gain module 116 and a variable gain amplifier 115. For example, the autotrim controller 114, on receipt of an instruction from the test circuitry, may set a gain trim procedure in motion whereby the sensor's output is amplified or attenuated by successive trim values provided to the trim gain module 116 by the autotrim controller module 114 and the adjusted outputs are compared with a reference voltage in the comparator 117. One comparison may be made per trim bit. As an example, for a particular axis of a particular device 104, successive trim codes (one for each bit of the result) may be computed in the device (in the auto trim controller 114, for example) based on a comparison between a voltage appearing at an output port 107 and a reference voltage applied from a selected one of the taps 130. The trim codes may be applied to a gain control input of the variable gain amplifier 115. The resulting, adjusted voltage appearing at port 107 may be compared again with the same reference voltage with the result of the comparison being used to compute the next trim value to be applied to the variable gain amplifier 115. After all bits are computed in the autotrim controller module 114 the result may be read and stored by the test circuitry 105.

The stored trim codes for offset and gain may be programmed into the device by conventional techniques.

The trimming circuitry, the auto trim controller, for example, may also be arranged to calculate an interpolated value for a gain trim code for programming into the device 104. This interpolation may involve determining a first gain trim code at a positive acceleration (in the case where the sensor 100 is an accelerometer for example) and then determining a second gain trim code at a negative acceleration. An interpolated value equal to an arithmetical combination of the first and second trim codes may then be computed. The interpolated trim code may be computed in the test circuitry 105 as an alternative to computing it in the device 104 itself.

Performing on-board voltage comparisons, that is within the integrated circuit package 104 rather than in the remote test circuitry 105, which may be a few feet away, offers a precision which significantly enhances the overall trimming accuracy. On-board trimming also has the advantages of resolving the problem caused by limited availability and cost of high precision analog input channels on production testers, and the reduction of their performance by noise or electro-magnetic interference due to long cables between the sensor mechanical handler and the tester. For Analog sensors, it allows a significant reduction in test time as an embedded digital state-machine may be employed to automatically do the binary search to find the best trim code at each step of the trim procedure. This removes most of the communication accesses between devices under test and the tester.

A trimming procedure may be run on all devices 104, 110, 111 in parallel under the control of the test circuit 105 and on all desired axes in rapid succession by switching the comparator's first input between the xout 107, yout 108 and zout 109 ports in succession.

A further advantage of the invention will now be explained with reference to FIG. 2.

Figure 2:
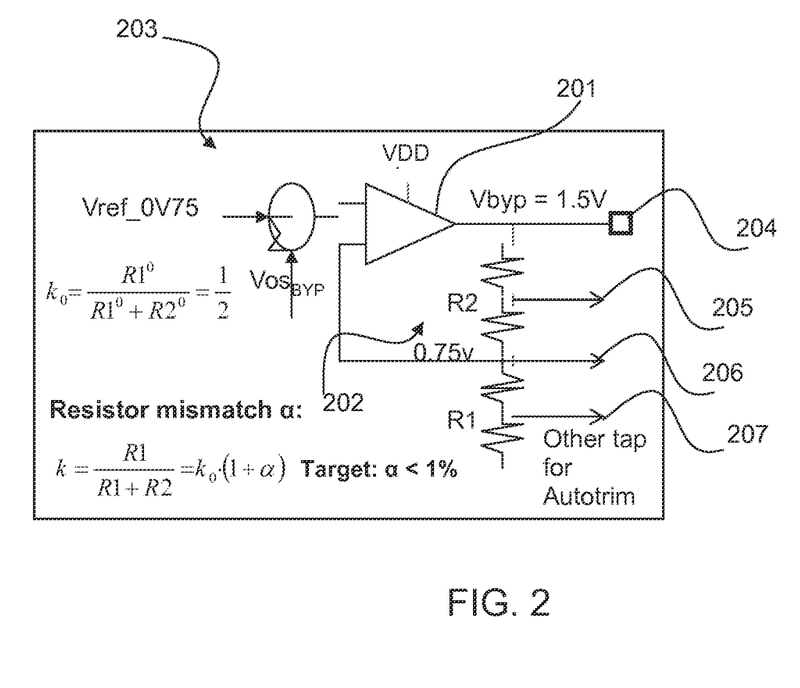
FIG. 2 is a simplified circuit diagram of components of a reference voltage generator.

Consider the typical reference voltage generator components of FIG. 2 comprising an operational amplifier 201 and resistance divider circuit 202 comprising resistances R1 and R2 (R1 and R2 may comprise one or more resistor elements). Such a voltage generator 203 may be used to provide a reference voltage VBYP (for example, for an analog to digital converter arranged to convert a voltage representing a sensor output to a digital signal). Say that a voltage source Vref of 0.75 volts, summed with an unknown and variable offset VOS_BYP (due for example to non-perfect operation of the operational amplifier) is applied to one input of the operational amplifier 201. The other input of the operational amplifier is provided by the resistance divider circuit 202 and in this example is taken from a point at the junction of the two resistors R1, R2. The resistances R1 and R2 are connected in series between an output 204 of the operational amplifier 201 and ground. An offset trim procedure is taken as an example but the conclusions can be extended to sensitivity/gain trim. For the purposes of this explanation, say that from the user's viewpoint the expected output voltage from the sensor in a zero acceleration (0 g) field condition is VBYP/2. That is to say that the sensor's offset and sensitivity specifications are defined in a ratiometric fashion with respect to VBYP. Hence the ideal output voltage from the sensor at 0 g acceleration can be written:

$$Vout_{ideal}^{0g} = \frac{Vbyp}{2} = \frac{1}{2} \cdot \frac{1}{\frac{R1}{R1+R2}} \cdot (Vos_{BYP} + Vref_{0V75}) = \frac{1}{1+\alpha} \cdot (Vos_{BYP} + Vref_{0V75})$$

Where alpha is the resistor mismatch which may be typically less than 1%.

In a conventional calibration procedure, the reference voltage for the comparator 117 of FIG. 1 may typically be taken from the voltage source Vref_0.75V (see FIG. 2). The offset DAC trim codes are swept until the comparator 117 toggles, signalling that the sensor's compensated output voltage has crossed the comparator's reference voltage. Hence, $$Vout + Vos_{COMP} = Vref_{COMP} = Vref_{0V75}$$

However, since the sensor offset which is responsible for the output offset is a continuous variable and the DAC trim module can only approximate this value due to its quantised output, the 0 g output voltage after offset trim contains a small and controled component linked to this quantisation error, hence, $$Vout^{0g} = Vref_{0V75} - Vos_{COMP} + V_{Qerror}$$

So the offset seen by the user (customer) in 0 g field is thus:

$$offset_{customer} = Vout^{0g} - Vout_{ideal}^{0g} \approx \alpha \cdot Vref_{0V75} \cdot (1-\alpha) \cdot Vos_{BYP} - Vos_{COMP} + V_{Qerror}$$

From this it will be seen that the offset of the VBYP voltage generator's operational amplifier 201 may directly impact the accuracy of an offset trim (and similarly a sensitivity trim). When other error sources are optimised (for example careful resistor matching to decrease the value of alpha and choosing relatively small trim steps in the DAC trim offset module) with this conventional approach the VBYP offset is the dominant error source.

The inventors have discovered that this error can be much reduced if the reference voltages for the comparator 117 (see FIG. 1) are taken from the feedback resistor ladder, at tapping points 205, 206 and 207 for example, instead of from the voltage source Vref. This will be evident from the following analysis with reference again to FIG. 2

As described above with reference to FIG. 2, the offset trim is taken as an example but the conclusions can be extended to the sensitivity/gain trim. From the user's viewpoint, the expected output voltage in a 0 g field can be written as above as $$Vout_{ideal}^{0g} = \frac{Vbyp}{2} = \frac{1}{2} \cdot \frac{1}{\frac{R1}{R1+R2}} \cdot (Vos_{BYP} + Vref_{0V75}) = \frac{1}{1+\alpha} \cdot (Vos_{BYP} + Vref_{0V75})$$

However, this time, the reference inputs for the comparator 117 (FIG. 1) may be tapped off the resistance divider circuit 202 of the VBYP regulator 203 instead of from Vref.

In the calibration process, the offset DAC trim codes are swept until the comparator toggles signalling that the output voltage has crossed the comparator reference voltage. Hence, $$Vout + Vos_{COMP} = Vref_{COMP} = Vcomp_{0V75} = Vref_{0V75} + Vos_{BYP}$$

However, once again, since the sensor offset which is responsible for the output offset is a continuous variable and the offset DAC module can only approximate this value due to its quantised output, the 0 g output voltage after offset trim contains a small and controled component linked to this quantisation error. Hence, $$Vout^{0g} = Vref_{0V75} + Vos_{BYP} - Vos_{COMP} + V_{Qerror}$$

The offset seen by the user/customer in a 0 g field is thus:

$$offset_{customer} = Vout^{0g} - Vout_{ideal}^{0g} \approx \alpha \cdot Vref_{0V75} + \alpha \cdot Vos_{BYP} - Vos_{COMP} + V_{Qerror}$$

From the above, it will be appreciated that the offset of the VBYP reference voltage generator's operational amplifier is now weighted by the resistor mismatch. So its contribution is decreased compared with the conventional method by typically 100 times. The dominant error source is now the reference voltage Vref_0.75 multiplied by the resistor mismatch.

Figure 3:
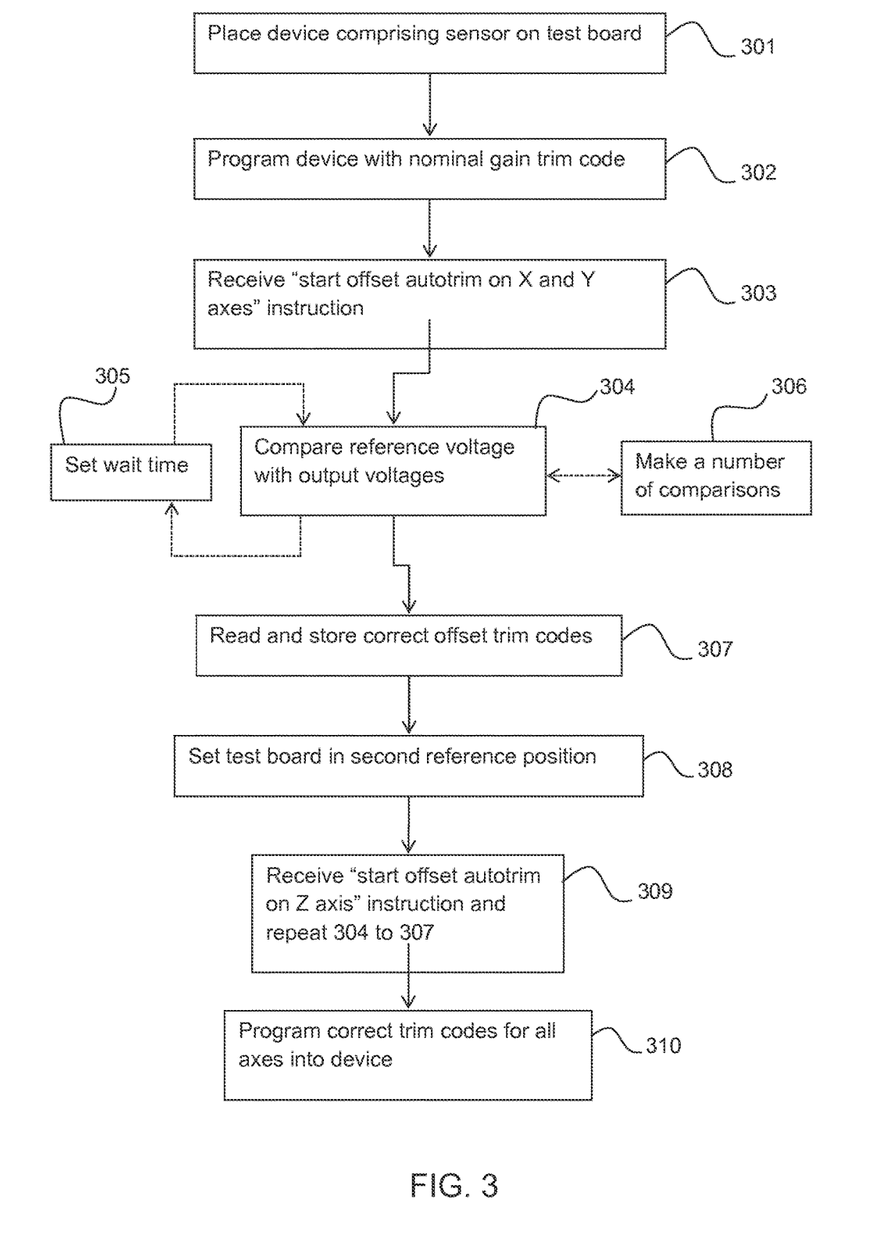
FIG. 3 is a simplified flowchart of a method for trimming an offset in a sensor.

An example of a method 300 for performing an offset trim for a sensor for one or more axes of sensitivity will now be described with reference to FIG. 3. A purpose of an offset trim procedure may be to compensate for any offset in the sensor's outputs and in any subsequent processing chain.

At 301, one or more sensors and their associated circuitry may be placed on a test board in a null acceleration field on their X and Y axes, for example. A sensor and associated circuitry may be implemented in a single package comprising an integrated circuit device. As such, several devices may be arranged on the test board for simultaneous trimming.

At 302, each device may be programmed with a nominal gain trim code.

At 303, each device on the test board receives a "start offset autotrim procedure on X and Y axes" instruction. In response to this instruction each device on the test board applies on one input of the comparator 117, a reference voltage set to a value such as that is expected to appear on the X and Y analog outputs of the sensor for a 0 g acceleration. (In the above example of FIG. 2, this was VBYP/2=0.75V). This reference voltage may be obtained using an appropriate tap on a resistance divider circuit of a reference voltage generator which may be included in each device. Additionally, digital circuitry comprising each device may successively connect the X and Y axis outputs of the device to the second input of the comparator 117.

Hence at 304, for each of the X and Y axes, the reference voltage may be compared with sensor output voltages which have been summed with trim values associated with successive offset trim codes, thereby determining the trim codes that cause the comparator to toggle. The process for ascertaining the correct trim code may be performed using one of several conventional techniques such as a linear search; starting at one end of the trimming range at incrementing or decrementing a trim data word until the comparator toggles or a binary search sometimes known as "successive approximation." As an example of the use of a successive approximation loop, say that the trim code values allowed are between 0 and MAX. In order to determine the most significant bit of the result the trim code may initially be set to 0.5 MAX. Depending on the comparator output, for the next step, the trim code may be set to either 0.25 MAX or 0.75 MAX. This process may continue, incrementing or decrementing the trim code until the correct binary word is determined. This process, when completed, determines the trim code which will provide on X and Y axes respectively, a voltage which is the closest to the expected (or targeted) value (VBYP/2 in the example of FIG. 2).

At 305, a wait time (optionally variable) may be set between setting a new offset trim code and the moment the comparison result is taken into account. The wait time may be a compromise between trim speed and the comparison precision.

Optionally at 306, an (adjustable) number of comparisons for the same trim bit for a particular axis (X or Y for example) may be made in order to allow a trade-off between trim time and noise.

At 307, once the correct offset trim codes (for each axis) are computed they may be read and stored by external circuitry using a digital interface provided for each device on the test board.

At 308, the test board may be set in a second reference position providing a null acceleration field on the Z axis of the sensor and a similar process comprising steps 304 to 307 may be performed following receipt of a "start offset autotrim procedure on Z axis instruction" at 309 in order to determine offset trim codes for the Z axis.

When all the offset trim codes for each axis have been determined for each device, these trim codes may be programmed into each device at 310. These codes (one per axis), once programmed inside a device may ensure that the analog outputs of the device for each axis will be close to a prescribed value.

Figure 4:
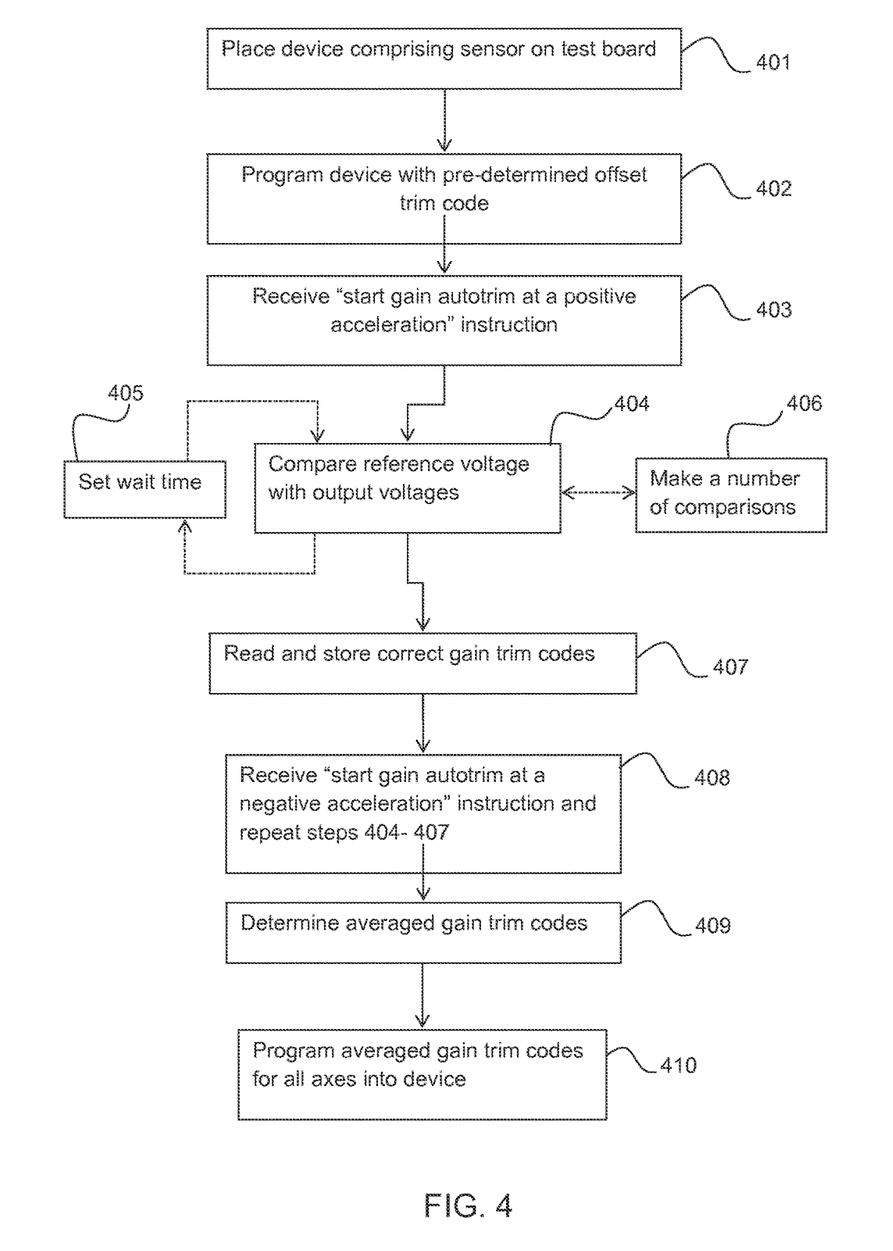
FIG. 4 is a simplified flowchart of a method for trimming a gain in a sensor.

An example of a method 400 for performing a gain trim for a sensor for one or more axes of sensitivity will now be described with reference to FIG. 4. A gain trim may be required in order to calibrate the sensitivity of a sensor and the actual gain in any subsequent processing chain. In order to compensate for any nonlinearity in a sensor's operation and for inaccuracies in locating it in the chosen testing positions or conditions, two gain trim codes may be computed for each axis and for each device on a test board. For example, one of the two gain trim codes (for each axis) may be determined for a positive acceleration and another gain trim code may be determined for a negative acceleration, in a case where the sensor is an accelerometer. A final value for a gain trim code may be an interpolation of the two computed gain trim codes.

At 401, one or more sensors and their associated circuitry may be placed on a test board in a g/sqrt(3) field on their X, Y and Z axes, for example, in the case of an accelerometer. A sensor and associated circuitry may be implemented in a single package comprising an integrated circuit device. As such, several devices may be arranged on the test board for simultaneous trimming.

At 402, each device may be programmed with a nominal offset trim code. In one example, each device may be programmed with an offset trim code determined by the method described above with reference to FIG. 3.

At 403, each device on the test board receives a "start gain autotrim procedure on X, Y and Z axes at a positive acceleration" instruction. In response to this instruction each device on the test board applies on one input of the comparator 117, a reference voltage set to a value such as that is expected to appear on the X, Y and Z analog outputs of the sensor for a g/sqrt(3) acceleration. This reference voltage may be obtained using an appropriate tap on a resistance divider circuit of a voltage reference generator which may be included in each device. Additionally, digital circuitry comprising each device may successively connect the X, Y and Z axis outputs of the device to the second input of the comparator 117.

Hence at 404, for each of the X, Y and Z axes, the reference voltage may be compared with sensor output voltages which have been amplified (or attenuated) by a gain value associated with successive gain trim codes until a gain trim code is found that causes the comparator to toggle. The process for ascertaining the correct trim code may be performed using one of several conventional techniques such as a linear search; starting at one end of the trimming range at incrementing or decrementing a trim data word until the comparator toggles or using a "successive approximation" technique. A successive approximation technique may typically ensure that after a certain number of steps (equal to the number of bits of the trim DAC) the output voltage of a device will match a reference (expected) voltage with a certain precision. The linear search will also ensure the same precision but generally after more steps.

At 405, a wait time (optionally variable) may be set between setting a new gain trim code and the moment the comparison result is taken into account. The wait time may be a compromise between trim speed and the comparison precision.

Optionally at 406, an adjustable number of comparisons for the same trim bit for each axis (X, Y and Z for example) may be made in order to allow a trade-off between trim time and noise.

At 407, once the correct gain trim codes (for each axis) are computed they may be read and stored by external circuitry using a digital interface provided for each device on the test board.

At 408, a "start gain autotrim procedure on X, Y and Z axes at a negative acceleration" instruction may be received by each device and the method from 404 to 407 may repeat for the case of a −g/sqrt(3) acceleration for each axis. Again, the reference voltages for applying to the comparator may be obtained from the appropriate taps of a resistance divider circuit of a reference voltage generator.

At 409, an interpolation or averaging procedure may be carried out to determine a final value for gain trim codes. In order to compensate for the sensor's and processing circuitry's nonlinearity an interpolated value g_interpolated for a gain trim code may be determined from the formula:

$$g\_interpolated = (g\_positive \times g\_negative)/((g\_positive + g\_negative)/2),$$

where g_positive is the gain (or gain trim code) determined for a positive acceleration and g_negative is the gain or (gain trim code) determined for a negative acceleration of the same magnitude.

When the final, averaged gain trim codes for each axis have been determined for each device, these trim codes may be programmed into each device at 410.

Nonlinearity in the gain DAC and variable gain amplifier may be compensated for by using a table: real_gain=f(trim code) obtained for example by simulation. Firstly, the table may be used to go from positive acceleration and negative acceleration trim codes towards simulated real gains. The "g_interpolated" parameter is computed based on the above formula, then the trim code is computed again by using the table.

The autotrimming procedure described above may be carried out by the manufacturer as part of a factory test or alternatively by the customer. A customer may employ the procedure after board mount, for example.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

As an example, a tangible computer program product may be provided having executable code stored therein to perform a method for trimming a sensor in accordance with the appended claims.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between digital and analog blocks are merely illustrative and that alternative embodiments may merge blocks or circuit elements or impose an alternate decomposition of functionality upon various blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the entire functionality of the modules and sensor comprising the device 104 of FIG. 1 may be implemented in an integrated circuit. Alternatively, the modules of FIG. 1 excluding the sensor may be implemented in an integrated circuit, said integrated circuit being capable of being operably coupled to the sensor 100. Such an integrated circuit may be a package containing one or more dies. Alternatively, any combination of the modules of FIG. 1 may be implemented as any number of separate integrated circuits or separate devices interconnected with each other in a suitable manner. An integrated circuit device may comprise one or more dies in a single package with electronic components provided on the dies that form the modules and which are connectable to other components outside the package through suitable connections such as pins of the package and bondwires between the pins and the dies.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A trimming circuit for a sensor, the trimming circuit comprising:
   a comparator;
   a voltage reference generator comprising a feedback resistance divider circuit having at least one tap, wherein the comparator is arranged to compare an output of the sensor with a reference voltage wherein the reference voltage is supplied from a tap of the feedback resistance divider circuit;
   an adjustment circuit configured to adjust an output of the sensor based on an output of the comparator, wherein the comparator is arranged to compare an adjusted output of the sensor with a reference voltage, and the reference voltage is supplied from a tap of the feedback resistance divider circuit; and
   a controller arranged to set a trim code for use by the adjustment circuit.

2. The trimming circuit of claim 1 wherein the adjustment circuit comprises a gain circuit arranged to apply a gain value associated with a trim code to an output of the sensor.

3. The trimming circuit of claim 1 further comprising a controller arranged to select a tap for setting a reference voltage for use by the comparator.

4. The trimming circuit of claim 1 further comprising a controller arranged to compute an interpolated gain trim code from gain trim codes determined at positive and negative acceleration values applied to the sensor.

5. The trimming circuit of claim 1 wherein
   the voltage reference generator is arranged to generate a full scale reference voltage for use by an analog to digital converter, and
   the trimming circuit is arranged to supply an output from the sensor to the analog to digital converter.

6. The trimming circuit of claim 1, including the sensor, being implemented in an integrated circuit device.

7. A trimming circuit for a sensor, the trimming circuit comprising:
   a comparator;
   a voltage reference generator comprising a feedback resistance divider circuit having at least one tap, wherein the comparator is arranged to compare an output of the sensor with a reference voltage wherein the reference voltage is supplied from a tap of the feedback resistance divider circuit;
   an adjustment circuit configured to adjust an output of the sensor based on an output of the comparator, wherein the comparator is arranged to compare an adjusted output of the sensor with a reference voltage, the reference voltage is supplied from a tap of the feedback resistance divider circuit, and wherein the adjustment circuit comprises an offset circuit arranged to apply an offset value associated with a trim code to an output of the sensor.

8. A method for trimming a sensor, the method comprising:
   comparing an output of the sensor with a reference voltage, wherein the reference voltage is supplied from a tap of a feedback resistance divider circuit of a voltage reference generator;
   adjusting an output of the sensor based on the comparison;
   adjusting an output of the sensor by an amount according to a trim code to produce an adjusted sensor output; and
   comparing the adjusted sensor output with the reference voltage supplied from the tap of the feedback resistance divider circuit of the voltage reference generator.

9. The method of claim 8 further comprising setting a wait time between applying the adjusted sensor output to an input of a comparator and making a comparison in the comparator with the reference voltage.

10. The method of claim 8 further comprising making an adjustable number of comparisons between the adjusted sensor output and the reference voltage.

11. The method of claim 8 comprising recording a determined trim code which, when applied to an adjustment circuit, produces a desired comparator result.

12. The method of claim 11 comprising determining an interpolated gain trim code from gain trim codes determined at positive and negative acceleration values applied to the sensor.

* * * * *